Figure 1:
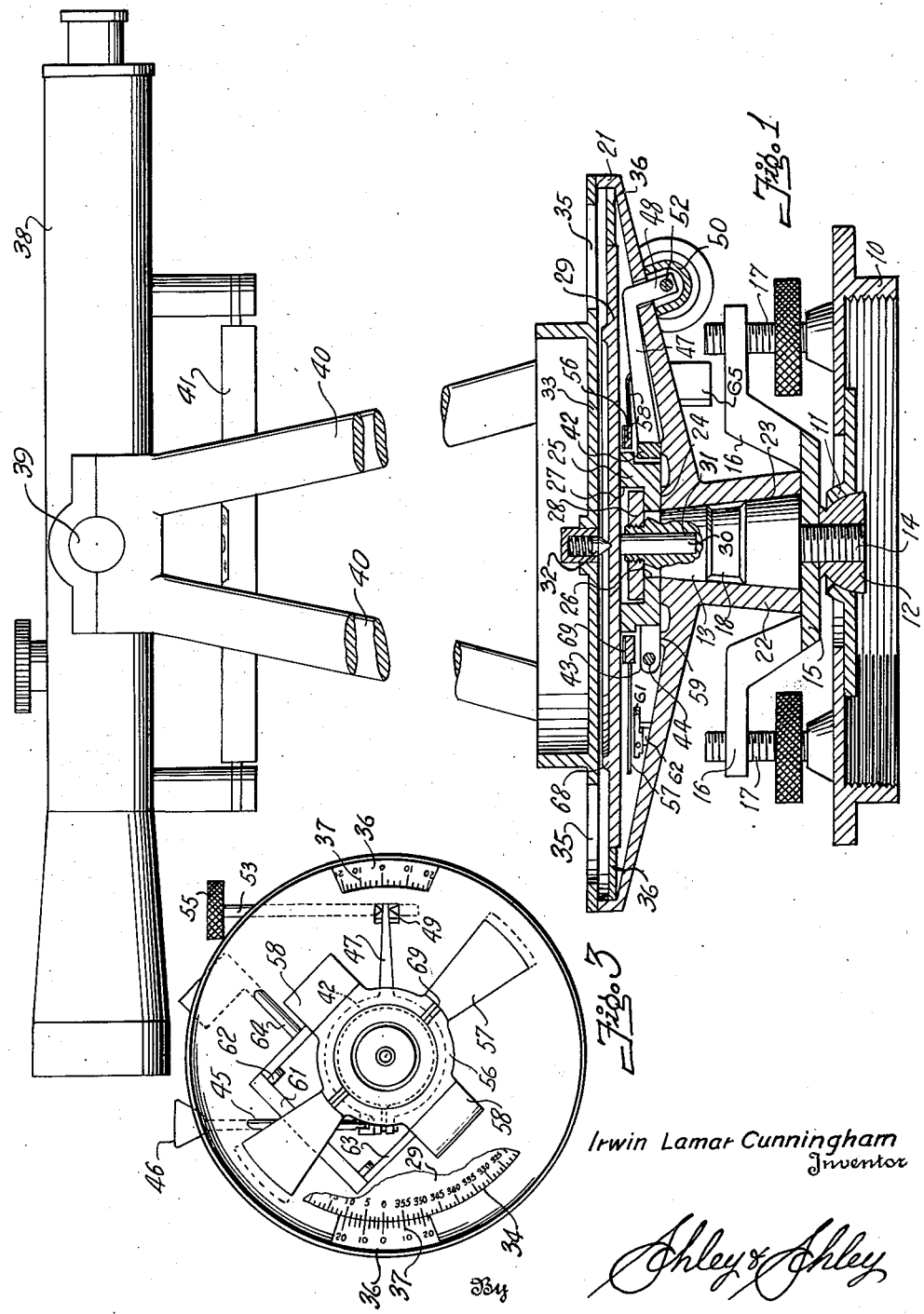

Dec. 18, 1951     I. L. CUNNINGHAM     2,579,067
OPTICAL ANGLE MEASURING SYSTEM

Filed Jan. 12, 1948     6 Sheets-Sheet 1

Irwin Lamar Cunningham, Inventor

Dec. 18, 1951  I. L. CUNNINGHAM  2,579,067
OPTICAL ANGLE MEASURING SYSTEM
Filed Jan. 12, 1948  6 Sheets-Sheet 2

Irwin Lamar Cunningham
Inventor

By Ashley & Ashley
Attorneys

Dec. 18, 1951     I. L. CUNNINGHAM     2,579,067
OPTICAL ANGLE MEASURING SYSTEM
Filed Jan. 12, 1948     6 Sheets—Sheet 3
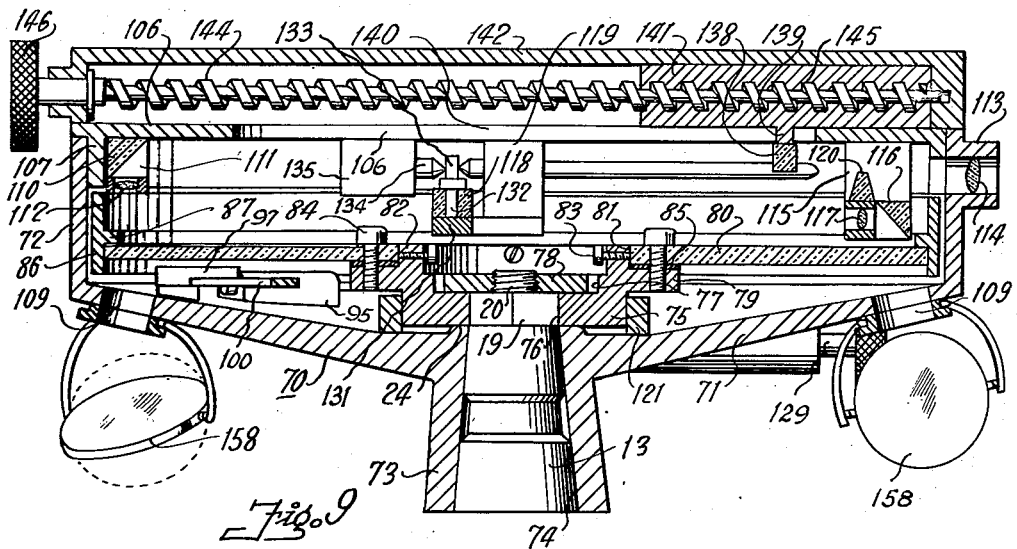
Fig. 9
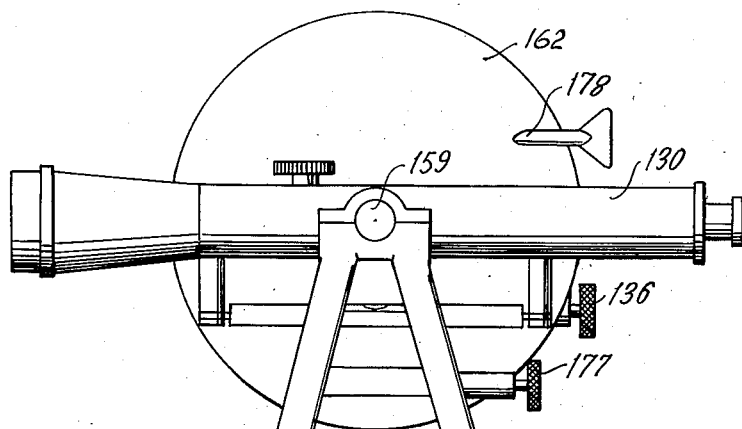
Fig. 8
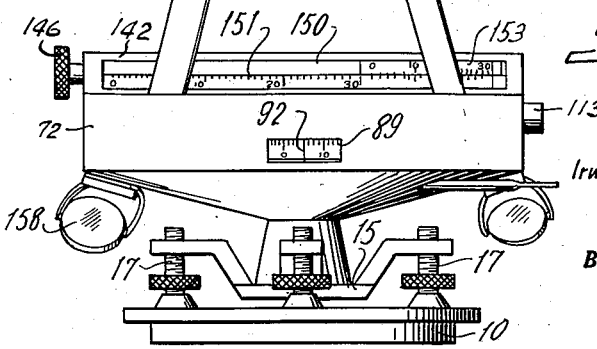
Irwin Lamar Cunningham
INVENTOR.
BY *Ashley & Ashley*
ATTORNEYS Dec. 18, 1951   I. L. CUNNINGHAM   2,579,067
OPTICAL ANGLE MEASURING SYSTEM
Filed Jan. 12, 1948   6 Sheets-Sheet 4
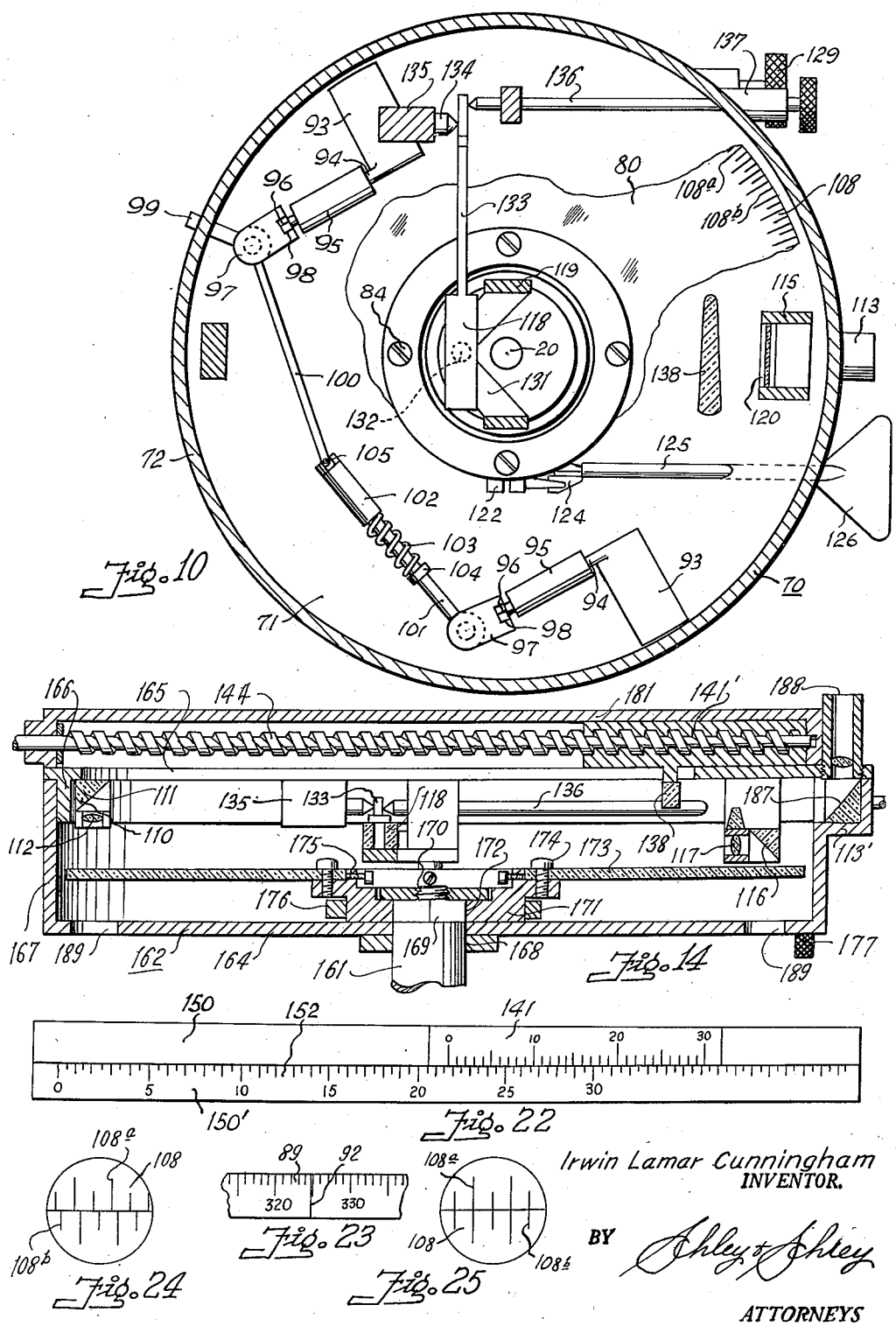
Irwin Lamar Cunningham
INVENTOR.
BY Ashley & Ashley
ATTORNEYS Dec. 18, 1951     I. L. CUNNINGHAM     2,579,067
OPTICAL ANGLE MEASURING SYSTEM Filed Jan. 12, 1948     6 Sheets-Sheet 5

Irwin Lamar Cunningham
INVENTOR.

BY Ashley & Ashley

ATTORNEYS

Dec. 18, 1951     I. L. CUNNINGHAM     2,579,067
OPTICAL ANGLE MEASURING SYSTEM
Filed Jan. 12, 1948     6 Sheets-Sheet 6
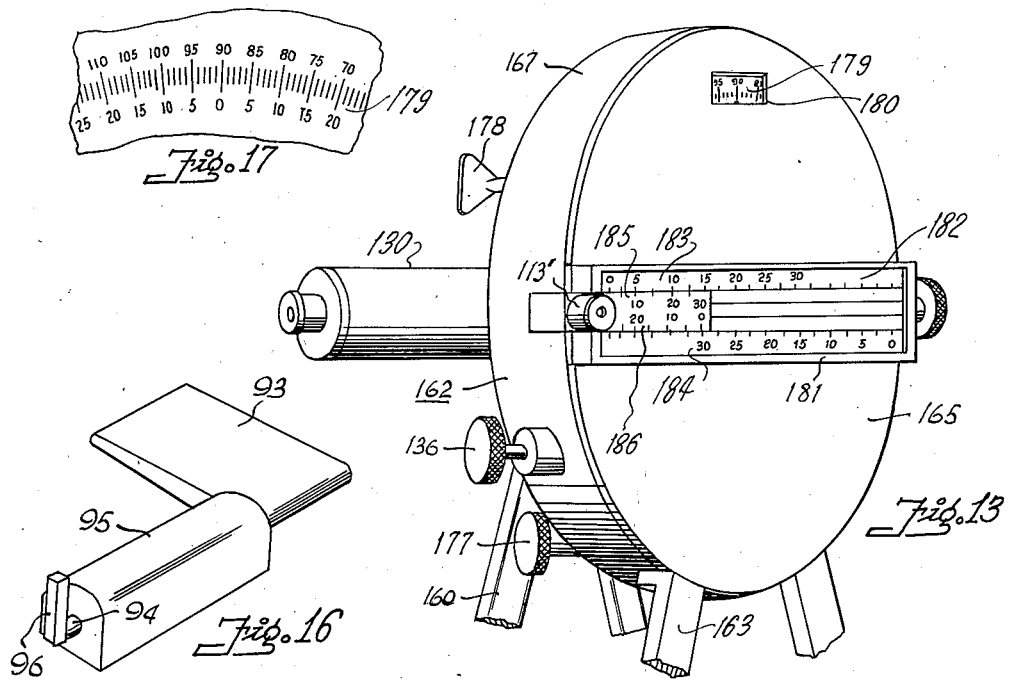
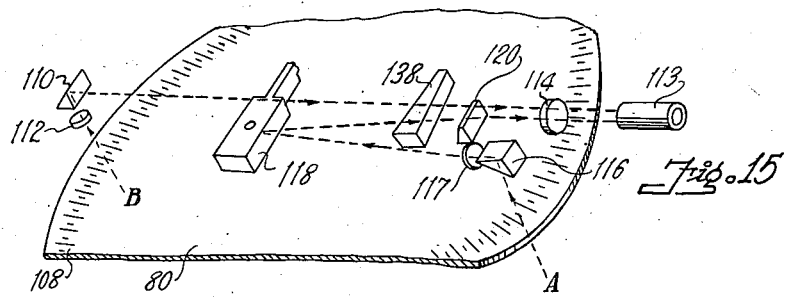
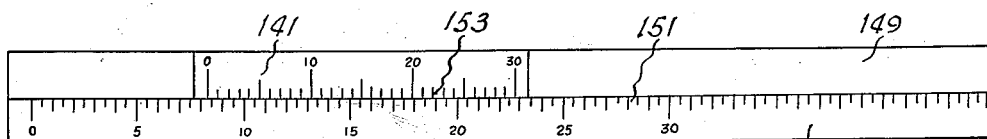
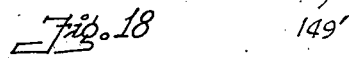
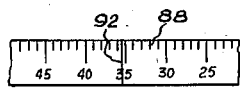
Irwin Lamar Cunningham
INVENTOR.
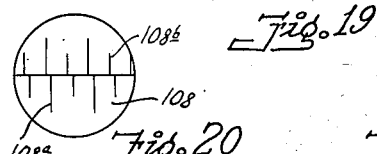
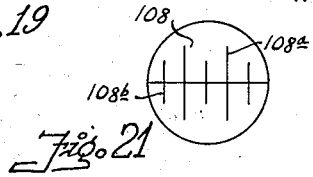
BY *Ashley & Ashley*
ATTORNEYS Patented Dec. 18, 1951

2,579,067

UNITED STATES PATENT OFFICE 2,579,067

OPTICAL ANGLE MEASURING SYSTEM

Irwin L. Cunningham, Odessa, Tex.

Application January 12, 1948, Serial No. 1,736

6 Claims. (Cl. 88—1)

This invention relates to new and useful improvements in optical measuring systems, and in particular to such systems as applied to surveying instruments.

A particular object of the invention is to provide an improved optical measuring system adaptable to the measuring of horizontal and vertical angles which is simple and convenient in operation.

A further object of the invention is to provide an improved surveying instrument which may be very accurately set upon a zero reading while trained upon a first point of observation and then very accurately set upon a second point of observation so as to measure the horizontal or vertical angle between said points with a high degree of accuracy and eliminating the necessity for addition or subtraction of the two readings obtained for the determination of the angle observed.

Another object of the invention is to provide an improved optical measuring system for the measurement of angles, which system may be set upon a zero reading with great accuracy while being trained in any desired direction.

A still further object of the invention is to provide an improved surveyor's instrument in which the operating parts are contained within a substantially weatherproof housing.

Still another object of the invention is to provide an improved optical measuring system employing a fixed and a movable support with observing means carried by the movable support and observed indicia rigidly connected to the fixed support so as to be immovable with respect thereto.

Yet another object of the invention is to provide an improved surveyor's instrument having a calibrated measuring disk which may be caused to rotate with the sighting portion of the instrument or locked into a non-rotative position so as to remain stationary with respect to the support of said instrument.

A further object of the invention is to provide an improved surveyor's instrument having an optical measuring system with provision therein for compensating for any inherent errors, or errors arising through operation of the instrument with additional means in the system for causing indicia carried thereby to become alined at any desired point with means for measuring the degree of adjustment necessary to obtain such alinement.

An important object of the invention is to provide an improved surveyor's instrument employing an optical measuring system having provision for obtaining a proximate reading of the angle being observed, and an expanded vernier means for effecting extremely accurate angular measurements.

A particular object of the invention is to provide an optical measuring system for the measurement of vertical and horizontal angles employing a calibrated disk from which a plurality of readings are taken and superimposed one upon the other, such readings coinciding at certain known angles, with provisions being made within the system for measuring with extreme accuracy the angular movement required to bring said readings into alinement whereby the angular reading may be determined with relatively great accuracy.

A still further object of the invention is to provide an improved optical measuring system of the character described which is applicable to either the horizontal or the vertical limb of a surveyor's theodolite, or to both of said limbs.

Other particular and further objects will appear in the course of the description of the structure and operation of the illustrated embodiment of this invention, and are to be understood as forming part and parcel of the intent and purposes of this invention.

A construction designed to carry out the invention will be hereinafter described together with other features of the invention.

Figure 2:
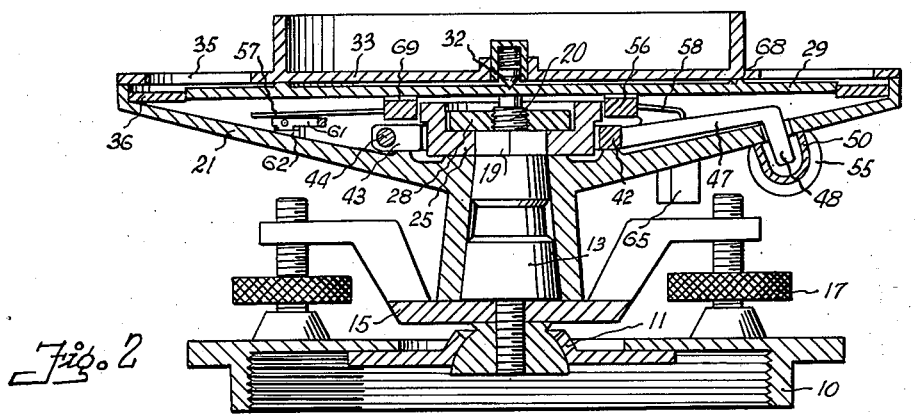
Figure 5:
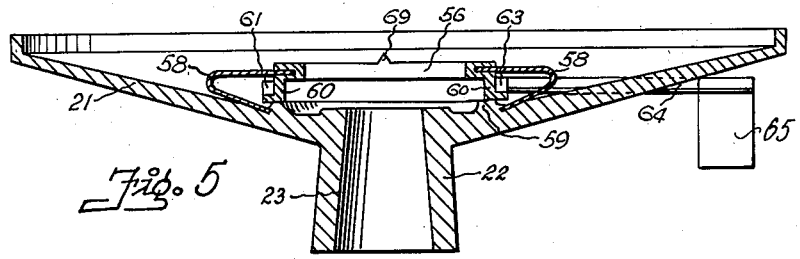
Figure 7:
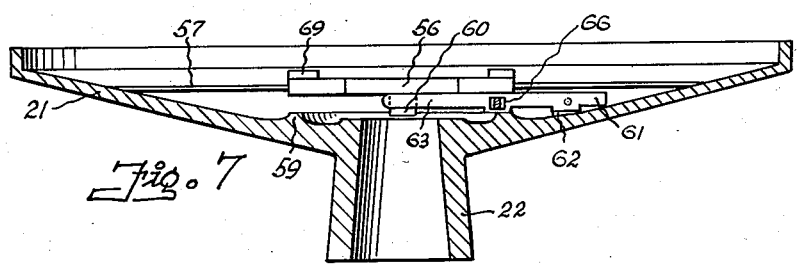
Figure 4:
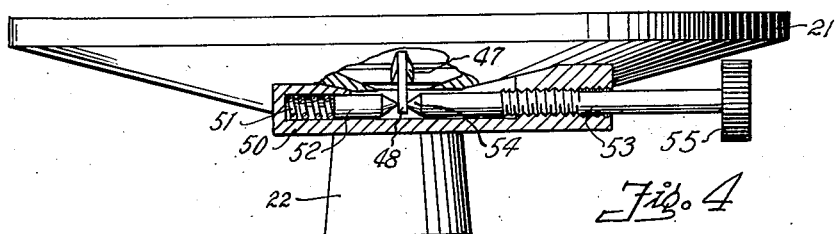
Figure 6:
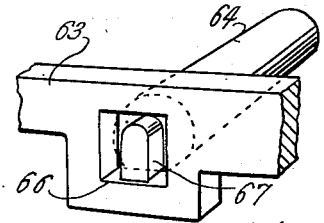
Figure 11:
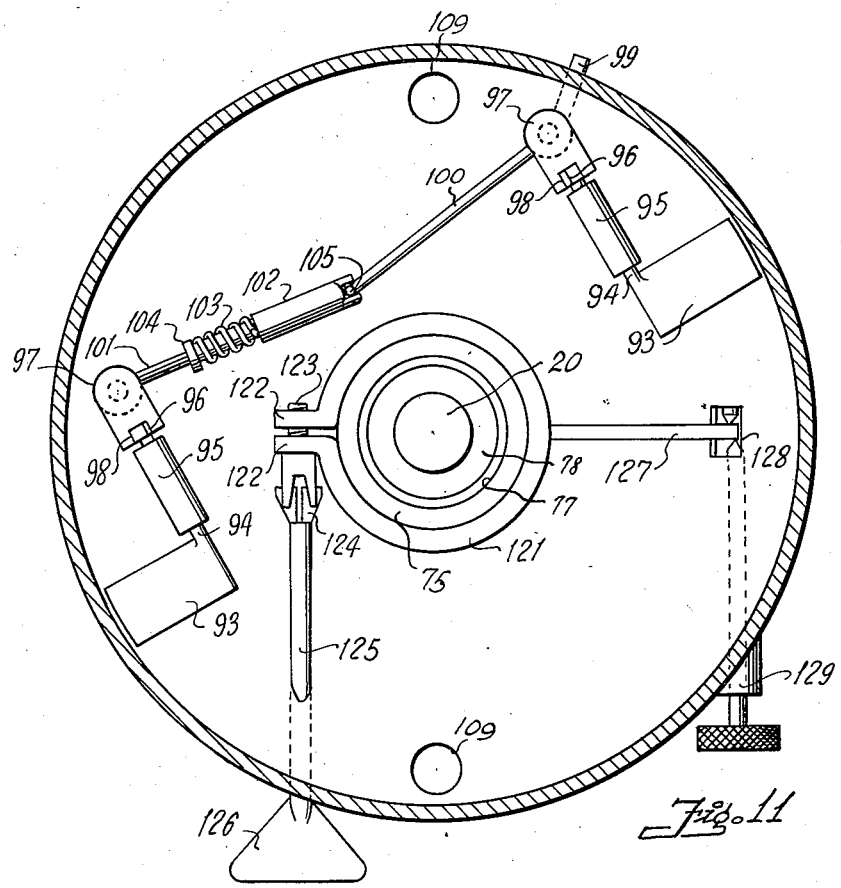
Figure 12:
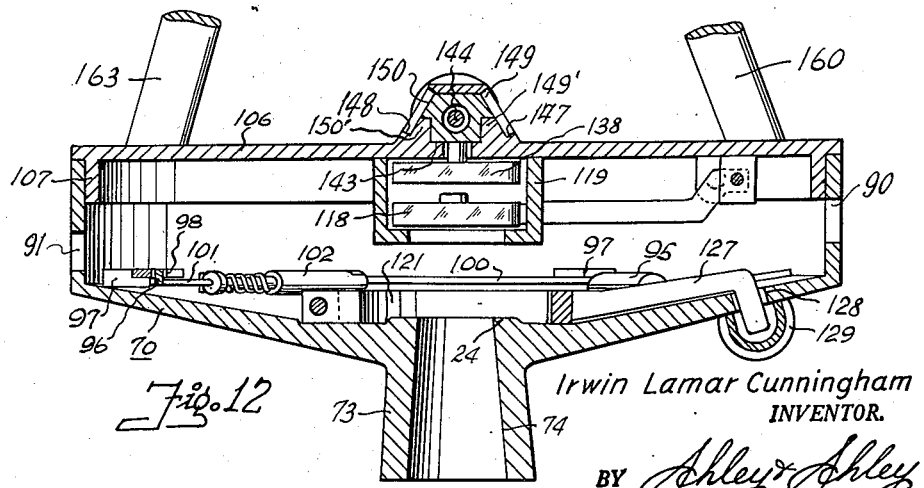

The invention will be more readily understood from a reading of the following specification and by reference to the accompanying drawings, wherein examples of the invention are shown, and wherein:

Fig. 1 is a side elevation, with the lower portion thereof broken away, of a surveyor's instrument constructed in accordance with this invention;

Fig. 2 is a vertical, sectional view of the lower portion of the instrument shown in Fig. 1, and showing the measuring plate in a raised position, Fig. 3 is a plan view of the measuring plate housing, with said plate removed, and showing the raising and clamping mechanism, Fig. 4 is a side elevation of the measuring plate housing, partially broken away to illustrate the clamp adjusting means, Fig. 5 is a vertical, sectional view of the measuring plate housing with the plate and clamping means removed to illustrate the arrangement of the plate raising device, Fig. 6 is an enlarged, isometric view of a portion of the measuring plate raising mechanism, Fig. 7 is a view similar to Fig. 5 and taken at right angles thereto, Fig. 8 is a side elevation of a surveyor's instrument constructed in accordance with a modification of this invention, Fig. 9 is an enlarged, vertical, sectional view taken through the horizontal angle measuring plate housing, Fig. 10 is a horizontal, sectional view of the housing shown in Fig. 9 with the measuring plate broken away and the measuring disk removed to illustrate the construction of the disk raising mechanism, Fig. 11 is a view similar to Fig. 10 and illustrating the clamping mechanism, and showing another position of the disk raising mechanism, Fig. 12 is a view similar to Fig. 9 and taken at right angles thereto with the measuring disk and meaursing cylinder removed, Fig. 13 is an isometric view of the vertical angle measuring structure, Fig. 14 is a horizontal, cross-sectional view taken through the vernier mechanism of the vertical angle measuring structure, Fig. 15 is a fragmentary, perspective, schematic view illustrating the optical system, Fig. 16 is an enlarged perspective of a portion of the measuring cylinder raising device, Fig. 17 is an illustration of a fragment of the direct reading vertical angle scale, Fig. 18 is an illustration of the right-hand vernier scale employed in the modified form of the invention, Fig. 19 is an illustration of a fragment of the direct reading scale for right-hand horizontal angles employed in the modification of the invention, Fig. 20 is an illustration of the reading obtained from the measuring plate for a right-hand angle as employed in the modified form of the invention, and with the indicia out of alinement, Fig. 21 is a view similar to Fig. 20 with the indicia alined, Fig. 22 is an illustration of the left-hand vernier scale, Fig. 23 is an illustration of a fragment of the direct reading scale for left-hand angles employed in the modified form, Fig. 24 is a view similar to Fig. 20 and representing the reading for a left-hand angle, and Fig. 25 is a view similar to Fig. 21 and representing the reading for a left-hand angle.

In the drawings, the numeral 10 designates an enlarged internally screw-threaded cap adapted to fit upon the upper end of the usual surveyor's tripod (not shown) for supporting a theodolite or other surveying instruments. The cap 10 carries a ball socket 11 at its center, said socket receiving the usual ball 12 to form a universal mounting. A tapered spindle 13 is provided with an axially extending, screw-threaded stud 14 projecting from its lower end, said stud engaging within the ball 12 and serving to clamp a supporting plate 15 between the bottom of the spindle 13 and the upper end of said ball. The plate 15 carries L-shaped levelling arms 16, and suitable levelling screws 17 extend between said arms and the upper surface of the cap 10. Employing this structure, the levelling screws 17 may be adjusted to cause the ball 12 to revolve within the socket 11 and thereby aline the spindle 13 in a vertical position. This structure is usual in this type of instrument and no claim is made thereto.

The spindle 13 is provided with the usual circumferential groove 18 at its medial portion, and has its upper end reduced to form a square, upstanding stud 19. A screw-threaded pin 20 extends vertically and axially from said stud.

A wide, shallow measuring plate housing 21 is adapted to be mounted upon the spindle 13. The housing 21 is in the form of a wide, shallow cone having its concave side directed upwardly and carrying a divergent, conical boss 22 projecting axially from its underside. The boss 22 is provided with an internal, tapered bore 23 within which the spindle 13 has a snug sliding fit, the lower extremity of the boss 22 being positioned adjacent the upper surface of the plate 15. When the housing is so positioned upon the spindle, the square stud 19 of said spindle projects into the interior of said housing and is surrounded by an annular bearing face 24 which may be machined or otherwise suitably formed upon the bottom interior surface of the housing. As shown in Figs. 1 and 2, this bearing surface 24 is raised slightly from the inner wall or bottom of the housing and is in horizontal alinement with the lower boundary of the stud 19.

A washer 25 is provided with a central, square opening 26 which snugly receives the square stud 19, the underside of said washer being adapted to engage the bearing surface 24 and confine the boss 22 of the housing 21 upon the spindle 13. A central recess 27 is formed in the upper surface of the washer 25 and receives a nut 28 which engages the screw-threaded pin 20 to retain the washer in position upon the stud 19. By reason of the square stud 19 and the square opening 26, the washer 25 is held against rotation with respect to the spindle and thus with respect to the tripod upon which the instrument is held. However, the housing 21 is free to rotate upon said spindle.

A suitable, circular measuring plate or disk 29 is disposed within the housing above the washer 25. The plate carries a cylindrical, depending stub axle 30 which engages within a cylindrical well 31 extending axially and downwardly through the pin 20 and the stud 19 into the spindle 13. The axle 30 has a snug sliding fit within the well 31 so as to permit the plate 29 to rotate freely but to prevent lateral movement or displacement of said plate. This mounting also permits vertical movement of the plate since the axle 30 may undergo vertical movement within the well 31.

In its lower position, the plate 29 rests upon the upper surface of the washer 25, such engagement being frictional in nature but sufficient to prevent annular movement of the plate with respect to the washer and thus with respect to the tripod. To enhance such frictional engagement, the plate is urged downwardly by a spring-pressed pivot pin 32 carried in the center of a top plate 33 which encloses the upper side of the housing 21. Being spring-pressed the pin 32 will permit upward movement of the plate 29, but normally urges said plate downwardly into engagement with the upper side of the washer 25. The pin also aids in centering and steadying the plate in the course of such revolution as the latter may undergo.

The plate 29 carries suitable angular measuring indicia 34 upon its upper surface, said indicia being positioned upon the marginal portion of the plate. The indicia is aranged in a right and left-hand limb upon the upper marginal portion of the plate. Thus, commencing at the zero, point, the plate is marked off in right and left-hand scales indicating degrees or fractions of degrees, said scales extending in right and left-hand directions from the zero starting point until they meet at 360° at said starting point. This marking or calibration of a surveying instrument measuring plate is usual and customary, provides two complete 360° scales extending, one in a right-hand direction and one in a left-hand direction. For the purpose of reading these scales, a pair of diametrically-opposed windows 35 are cut in the top plate 33 near the marginal portion thereof. So positioned, the windows permit observation of the marginal scales appearing upon the plate 29, and also observation of a pair of diametrically-opposed vernier scales 36 secured to and within the housing 21 immediately below said windows. The vernier scales 36 are arcuate in shape and thus conform closely to the periphery of the plate 29. The vernier plates 36 carry the usual vernier scales 37 which permit reading of an indicated angle to a fraction of a degree, and interpolation of this reading to a still smaller fraction of a degree.

The usual observing telescope 38 is pivotally mounted upon trunnions 39 carried at the upper end of a pair of bipod supports 40 which are formed integrally with and extend upwardly from the cover plate 33. The telescope carries the usual level indicator 41 suspended on brackets therefrom. With this structure, the telescope may be swung in a vertical arc upon the trunnions 39, or may be rotated in a horizontal plane by rotating the housing 21.

For rendering the housing rotatable or non-rotatable with respect to the spindle 13 and the tripod upon which the instrument is carried, an annular clamp 42 is positioned within the interior of the housing so as to encompass the lower outer periphery of the washer 25. The clamp 42 is of the split ring type having a pair of radially extending ears 43 adapted to be urged together by a suitable screw-threaded bolt 44 so as to compress the ring into a clamping position or expand the ring into a non-clamping position. An actuating rod 45 extends slightly upwardly at an angle and through the bottom of the housing 21, and has its inner end connected in a universal fashion to the bolt 44. The outer end of the rod 45 projects below and beyond the housing and carries a suitable handle or knob 46 upon its outer extremity. In this fashion, the handle 46 may be rotated in either direction so as to actuate the bolt or screw 44 and thus tighten or loosen the clamp 42 upon the washer 25. The universal connection between the operating rod and the bolt 44 permits the clamp freedom of circumferential movement in tightening and loosening without necessitating lateral shifting of the rod as the ears 43 move radially during operation of the clamp. Such provision allows the rod to have a relatively tight and weatherproof fit with respect to the bottom of the housing 21 with the consequent advantages resultant therefrom.

Diametrically-opposed from the ears 43, the clamp 42 carries an elongate, radially-extending arm 47 which projects contiguous to the bottom of the housing 21 to a point near the marginal portion thereof. The outer end of the arm 47 is bent downwardly to form a finger 48 which projects through a slot 49 in the bottom of the housing, said finger extending a short distance below the underside of said housing. An elongate tubular boss 50 having one end closed, is affixed to the underside of the housing 21 in vertical alinement with the slot 49, said boss being positioned horizontally and extending perpendicular to the axis of the arm 47. A spring 51 is confined within the enclosed end of the boss and urges a plunger 52 into engagement with one side of the finger 48. The plunger 52 has its end which engages the finger in the form of a relatively short cone whereby frictional resistance between these two elements is reduced. An elongate, screw-threaded, adjusting screw 53 is carried within the opposite end of the boss 50 and has its conical tip 54 engaging the opposite side of the finger 48 so as to confine said finger between the plunger 52 and the inner end of the adjusting screw 53. A suitable handle or knob 55 is provided upon the outer end of the adjusting screw 53, said knob permitting rotation of the screw for adjusting its position within the boss 50 and thus the position of the inner tip 54 of said screw with respect to the opening or slot 49.

The plunger 52 serves merely to hold the finger 48 in engagement with the screw 53, this engagement holding, by means of the arm 47, the clamp 42 against rotation with respect to the housing 21. When the clamp is in its loosened or released position, it does not engage the washer 25 and thus the clamp and the housing are free to rotate with respect thereto. However, when the clamp is tightened about the washer 25, it serves to anchor the housing to said washer and thus prevent the rotation of the housing with respect to the tripod upon which the instrument is supported. After the clamp has been tightened, the adjusting screw 53 may be employed to effect delicate and fine adjustments of the angular position of the housing with respect to the clamp 42 and the washer 25.

As before pointed out, when the measuring plate 29 is in its lower position, it engages the upper surface of the washer 25 in a frictional manner and is thereby held against rotation with respect thereto. It is desirable to provide means for lifting the plate from engagement with the washer so as to permit the rotation of the former with the housing 21. To effect this vertical movement, an annular raising ring 56 is positioned within the housing above the clamp 42 and encircling the upper portion of the washer 25. The raising ring 56 does not at any time engage the washer or the clamp, and is normally free to rotate with respect to said washer.

A pair of diametrically-opposed springs 57 have their inner ends suitably embedded or affixed to diametrically-opposed points upon the raising ring 56, said springs being relatively long and wide, and having their outer ends embedded, or otherwise suitably affixed to the bottom of the housing 21. This structure is best illustrated in Figs. 3 and 7 which show that the springs 57 extend in a substantially horizontal plane within the interior of the housing 21 with their flat sides facing upwardly and downwardly therein. Being relatively thin, the springs do not occupy an appreciable proportion of the vertical space within said housing, but, being securely affixed both to the housing and to the raising ring 56, prevent rotation of said ring with respect to the housing. At the same time, the springs are adapted to undergo a considerable degree of curvature in a vertical arc which permits the ring 56 to move vertically within the housing while being so prevented from rotation. To prevent interference with the operation of the adjusting arm 47 of the clamp 42, the longitudinal axis of the springs 57 is displaced approximately 45° from the longitudinal axis of said arm.

A second pair of diametrically-opposed springs 58 are secured to the ring 56 approximately 90° from the springs 57. The springs 58 are of the bowed, leaf type and each has one end secured to the periphery of the ring 56 similarly to the springs 57. The springs 58 are doubled upon themselves and have their opposite ends embedded or otherwise affixed to the inner wall of the housing 21 adjacent an annular bearing surface 59 upon which the clamp 42 rests and which is disposed concentrically with respect to the bearing surface 24. Being of the bowed type, the springs 58 constantly urge the raising ring 56 upwardly with respect to the housing 21 and the washer 25. They also supplement to a considerable degree the action of the springs 57 in preventing the ring 56 from rotating with respect to said housing.

The raising ring carries a pair of diametrically-opposed, depending, L-shaped fingers 60 having their lower portions directed radially outwardly so as to underlie the upper portions of the springs 58. A U-shaped yoke 61 is pivotally mounted upon suitable ears 62 carried by the bottom wall of the housing 21 so as to be disposed in a substantially horizontal plane within said housing. The yoke 61 straddles the ring 56 and has each of its arms 63 engaging between the laterally-extending portions of one of the fingers 60 and the upper portion of one of the springs 58. Upon downward swinging of the arms 63 about the ears 62, the fingers 60 are engaged and the ring 56 is urged downwardly. Similarly, as the arms 63 are swung upwardly in a vertical arc, the springs 58 are allowed to move the ring 56 in an upward direction.

An actuating rod 64 extends through the inclined bottom of the housing 21 and carries a suitable handle 65 upon its outer end. The inner end of the rod 64 engages one of the arms 63 of the yoke 61 at a point between one of the pivot ears 62 and the outer extremity of said arm. The engaged arm is enlarged at the point of engagement and carries a transverse window 66 which receives a cam tip 67 provided upon the inner end of the rod 64. The cam 67 is substantially rectangular in outline and thus is adapted to permit limited vertical movement of the arm and thereby the yoke 61 upon rotation of the rod 64 through 90°. Thus, in one position, the bottom of the window 66 would be engaged by the end of the cam tip while in the other position the side of the cam tip would be engaged by the bottom of the window. Through this relatively small vertical swinging of the yoke, the raising ring 56 is moved downwardly to its lower position and the measuring plate 29 thereby lowered into frictional engagement with the washer 25. Upon raising of the yoke 61, the ring 56 is moved upwardly and causes the plate 28 to be raised within the housing 21 and lifted from engagement with the washer 25.

The measuring plate carries an annular, raised rib or abutting surface 68 upon its upper surface. The rib 68 is arranged concentrically upon the surface of the plate and spaced outwardly a considerable distance from the center thereof so as to be adjacent the scales 33 provided upon the marginal portion of said plate. In its raised position, the rib abuts the underside of the cover plate 32 in a frictional manner so as to aid in preventing rotation of the measuring plate with respect to the housing. For further aiding in preventing rotation of the measuring plate, the raising ring 56 is provided with a pair of diametrically-opposed knife edges 69 upon its upper surface. The knife edges 69 extend radially of the ring and are positioned one above each of the points of engagement of the raising ring with the springs 57. Being radially disposed upon the raising ring, the knife edges, when engaged with the underside of the measuring plate 28, exert a maximum restraint upon rotation of said plate with respect to said raising ring. Since the raising ring is securely held against rotation with respect to the housing by means of the two pairs of springs 57 and 58, the measuring plate is thus very securely held against rotation with respect to said housing. In addition, the knife edges prevent rotation of the plate in the course of its short travel from its lower to its upper position, since the knife edges engage the plate prior to and during such limited vertical movement.

In the operation of this instrument and the utilization of this measuring system, the instrument is first set up at the desired location and suitably leveled by means of the screws 17. The handle 65 is rotated to revolve the rod 64 and move the measuring plate 29 into its lower position wherein it engages the upper surface of the washer 25 and is thus held against rotation with respect to the surrounding terrain. In this position, the measuring plate may be considered as fixed or immovable, and its position with relation to the housing 21 altered or varied by means of loosening the clamp 42 and revolving the housing about said plate. Such revolution is continued until the zero line on the scales 34 carried by the measuring plate alines in proximate fashion with the zero line of the desired vernier scale 37. Following this, the clamp 42 may be tightened and final and minute adjustments of the housing with respect to the measuring plate made by adjustment of the screw 53 which causes the housing to shift slightly with respect to said clamp 42.

Having thus set the measuring plate at zero with respect to the housing, the former may be raised through actuation of the handle 65 and the yoke 61 so that the plate is held immovably with respect to the housing. Then the clamp 42 may be released and the housing revolved to bring the telescope 38 to bear upon the first sighting point. During such revolution, it is to be noted, the measuring plate remains set exactly at zero with respect to the housing. Having brought the housing into a position wherein the telescope, which normally contains or carries cross hairs or a reticule (not shown), into proximate alinement with the object representing the first sighting point, the clamp 42 may again be tightened and the angular position of the housing adjusted by the screw 53 to bring the reticule in exact alinement with the before mentioned first sighting point. Upon completion of these steps, the zero line of the measuring plate has been alined with exactness with the first sighting point, and the operator is ready to make an actual measurement.

The measuring plate 29 is now moved to its lower position through actuation of the handle 65 and the yoke 61. After this step, the plate is held immovable with respect to the tripod and thus with respect to the surrounding terrain and the first sighting point. The clamp is released and the housing then revolves until the telescope is approximately alined with the second sighting point which may be displaced a considerable angular distance from the first sighting point. Upon again tightening the clamp 42, and making minute adjustments with the screw 53, the telescope, and therefore the housing may be brought into exact alinement with the second point of observation, and an accurate determination of the angle measured be effected by a reading of the indications upon the scale 34 of the measuring plate and the scale 37 of the vernier. At the same time, the opposite or 180° angle may be read by means of the diametrically opposed vernier.

If additional accuracy is required, the reading of the observed angle may be doubled so as to reduce the subjective error. Such doubling of the angle may be accomplished by raising the measuring plate, releasing the clamp and returning the telescope to the first point of observation. The clamp may be tightened and the adjusting screw 53 employed to obtain an exact sight upon said object. Having completed these steps, the reading of the angle obtained is now alined with the first point of observation. The plate 29 may now be lowered and the clamp released so that the telescope can again be swung to the second point of observation. Here, again, the clamp is tightened and an exact alinement of the telescope with the second point of observation obtained by means of the adjusting screw 53. The reading now taken from the instrument represents twice the measured or desired angle reading with the consequent reduction in subjective error.

Of course, if desired, the plate 29 need not be set at zero at the beginning, but a reading may be taken and recorded as a zero reading. Such reading is later to be added or subtracted to or from the final reading as the case may be.

Right and left-hand angular measurements are made in the usual fashion by reading the applicable scale by means of the particular vernier in use. At the same time, the opposite reading may be obtained from the second vernier scale.

The structure illustrated and described eliminates to a substantial degree many of the objective errors present in this type of instrument by reason of its rigid and exact structure. At the same time, it prevents many of the subjective errors which arise since provision is made for shifting the measuring plate so that its zero line coincides with any desired point. Unintentional errors in reading angles and in calculating the actual angle observed are thus reduced to a substantial minimum.

In Figs. 8 through 21 of the drawings, a modified form of the invention is illustrated. This modification employs an optical system of measurement which is extremely accurate and permits very close readings of observed angles. At the same time, this modification incorporates the basic principle of the first form described which permits the shifting of the measuring plate or cylinder so that its zero line coincides with any desired point.

The modified form of the invention employs the cap 10 supporting the base plate 15 and utilizing the adjusting screws 17 in the same fashion as the first described form of the invention, these elements being similar in all material respects to those described hereinbefore. The base plate 15 carries the spindle 13 having a square boss 19 and an upwardly extending screw-threaded pin 20 at its upper end. A housing 70 having a dished bottom 71 and an upstanding marginal flange 72, carries a central depending boss 73 of conical shape and having a tapered bore 74 which receives the spindle 13 in a snug sliding fit.

A washer 75, similar in some respects to the washer 25, is provided with a central, square opening 76 which receives the square stud 19 and holds said washer against rotation with respect to the spindle 13. The washer carries a central recess 77 in its upper surface, said recess accommodating a lock nut 78 which engages the screw-threaded pin 20 and retains the washer in position upon the stud 19. The boss 73 of the housing is thus retained between the under side of the washer and the upper side of the bottom or support plate 15. Again, the boss 19 is surrounded by an annular bearing surface 24 against which the under side of the washer 75 bears and which permits rotation of the housing with respect to said washer.

An external, annular flange 79 is formed upon the washer 75 and adapted to receive a transparent measuring plate 80 which may be formed of glass or plastic or any other suitable or similar material. The plate 80 is circular in shape and has a circular opening 81 cut in its central portion, the opening 81 receiving an upstanding annular flange 82 carried upon the upper surface of the washer 75. Suitable adjusting screws 83 extend radially outwardly through the flange 82 and have their outer ends engaging the inner periphery of the opening 81. By regulation and adjustment of the screws 83, the plate 80 may be concentrically positioned and alined with respect to the spindle 13. Suitable retaining bolts or screws 84 extend downwardly through the inner margin of the plate 80 into the annular flange 79, there being a circular washer or gasket 85 confined between the upper side of said flange and the under side of the plate. Thus, by adjusting the screws 83 to position the plate concentrically, and then tightening the screws 84 to lock the plate in position, all likelihood of the plate becoming misalined with respect to the spindle 13 may be substantially eliminated. At the same time, provision is made for centralization and adjustment of the plate at any future times when such an operation may be required.

The marginal portion of the plate 80 terminates a short distance from the inner wall of the upstanding flange 72 of the housing 71, and is adapted to support a measuring cylinder 86. The cylinder 86 is relatively short and of such inside diameter as to receive the plate 80, the outer diameter of the cylinder being, of course, less than the inside diameter of the flange 72. The cylinder carries an inwardly directed, annular flange 87 at a point substantially midway between its top and bottom spaces. The flange 87 extends inwardly from the cylinder a distance sufficient to permit its engagement with the outer marginal portion of the plate 80, so that the cylinder is supported in position upon said plate by the engagement of said flange with the plate.

A double scale, calibrated in degrees, extends circumferentially around the outer surface of the cylinder 86. The upper scale, 88 (Fig. 19) reads from zero to 360° and is arranged in a counter-clockwise fashion around the periphery of the disk as viewed from its upper side. A second scale 89 (Fig. 8) is disposed upon the lower portion of the cylinder and extends around the same in a clockwise fashion, said lower scale also including 360°. The upper scale 88 may be designated as the right-hand scale, and may be viewed through a window 90 cut in the flange 72 upon the right-hand side of the housing 70 as viewed in Fig. 12. The lower, or left-hand scale 89, is viewed through a similar window 91 cut in the flange 72 at a point diametrically opposed to the location of the window 90 and being positioned in a horizontal plane below the plane of the latter window. Each of the windows 90 and 91 carries a cross hair 92 with which the applicable scales may be read. The function of these two scales will appear more fully hereinafter. However, it suffices for the present to state that they provide means for making a rough reading of the angle being observed for the purpose of determining the approximate magnitude of the same within an accuracy of one-half of a degree.

In measuring angles to the left, the left-hand scale will be viewed through the left-hand window. Similarly, in measuring angles to the right, the right-hand scale will be viewed through the right-hand window. In this manner, a source of subjective error which often occurs by reason of the operator's observing the wrong scale, is substantially eliminated or at least minimized.

In this modification, the measurement cylinder 86 replaces to some extent the measuring disk 29. Since the plate 80 is held at all times against rotation with respect to the spindle 13 and thus the tripod (not shown) upon which the instrument is supported, it is desirable to be able to lift the cylinder from engagement with the plate and thereby permit its rotation with respect thereto, or to allow the cylinder to rest upon the plate and remain immovable therewith. For this function, a marginal lifting device is provided. The device includes a pair of wide, flat, horizontally disposed flippers 93 adapted to engage beneath the lower edge of the cylinder 86. The flippers 93 are positioned at diametrically opposed points within the lower portion of the housing 70 and are carried upon suitable shafts 94 supported within bearing blocks 95 formed integrally or otherwise suitably affixed to the upper side of the bottom 71 of the housing 70. The opposite ends of the shafts 94 carry upstanding ears 96 which project upwardly therefrom. A pair of clevises 97 are pivotally mounted upon the upper surface of the bottom 71 and have vertical slots 98 which receive the ears 96. The clevises 97 are adapted to rotate in a horizontal plane and, through engagement of the ears 96 within the slots 98, rotate the shafts 94 and cause the flippers 93 to move upwardly and downwardly in a vertical arc.

One of the clevises carries an integral arm 99 extending laterally therefrom and projecting exteriorly of the housing 70 so as to be manually operable from the exterior or outside thereof. This same clevis also carries an integral toggle rod 100 projecting toward the opposite clevis. The second clevis carries an integral toggle bar 101 projecting toward the bar 100 and having its outer end telescoped by a toggle sleeve 102. A suitable spring 103 is compressed between the inner end of the sleeve 102 and a stop 104 carried by the bar 101 so as to urge the sleeve 102 constantly outwardly with respect to the bar 101. The outer end of the sleeve is notched and receives a transverse pin 105 provided in the outer end of the toggle rod 100. Due to the influence of the spring 103, a toggle action is achieved which causes the clevises 97 to assume either a convergent or a divergent position. In such positions, the ears 96 are either moved toward or away from one another, thus causing the flippers 93 to be either raised or lowered. Since one of the clevises may be manually operated by means of the lever or arm 99, and such rotative movement is transmitted to the opposite clevis by means of the engaging toggle bar and toggle sleeve, said opposite clevis is also caused to move at the same time the first named clevis is moved. Thus, an arrangement is provided which permits the simultaneous raising or lowering of the flippers 93.

As is clearly shown in Figs. 10 and 11, the outer extremities of the flippers 93 are positioned adjacent the inner wall of the marginal flange 72 of the housing 70. In this position, the flippers underlie the lower edge of the measuring cylinder 86 and may engage the same upon upward movement. In the lower position of the flippers, the cylinder is allowed to rest upon the upper surface of the plate 80. However, upon suitable actuation of the arm 99, the flippers 93 are caused to lift or raise, thereby engaging the bottom edge of the cylinder 86 and raising said cylinder from engagement with the plate 80. The flippers 93 are secured to and rotate with the housing 70 so that the cylinder 86 is caused to rotate with said housing when it is lifted from the plate 80 and supported solely upon said flippers. It is to be noted that this vertical movement is not sufficient to remove either of the scales 88 or 89 from the field of observation through the windows 90 and 91. In this manner, the scales may be read whether the cylinder is in its upper or its lower position.

The upper side of the housing 70 is closed by a suitable, transverse, circular plate 106 which may be secured to the housing in any suitable or desirable fashion. The plate 106 carries a marginal, depending flange 107, spaced inwardly a slight distance from the periphery of the plate and adapted to engage snugly within the diameter of the marginal flange 72 of the housing. The depending flange 107 extends downwardly a short distance into the housing and engages the upper edge of the measuring cylinder 86 when the latter is in its raised position. With this structure, an additional clamping surface is provided for said cylinder, said surface also functioning to engage the upper edge of the cylinder 86 and prevent tipping or tilting of the same when it is raised by means of the flippers 93. In this manner, the cylinder is retained in a horizontal plane so that the indicia 88 and 89 may be read in a proper fashion in either the upper or lower positions of said cylinder.

As before pointed out, the measuring cylinder 86 makes provision only for the reading of an observed angle to a fraction of a degree. It is desirable, of course, to read the observed angle as closely and accurately as possible. For this reason, the plate 80 is provided with radially extending indicia 108 arranged in an annulus about its periphery and spaced slightly inwardly therefrom. The indicia 108 consists of alternate long index lines 108a and short index lines 108b, the spacing between adjacent short and long index lines representing one degree.

An optical system is provided for reading and interpolating the annular index 108. The system includes a pair of diametrically opposed openings 109 cut in the bottom 71 of the housing 70. The openings 109 underlie the marginal portion of the transparent measuring plate 80 so as to be in vertical alinement with the index or scale 108. At the left-hand side of the housing 70, as viewed in Fig. 9, a reflecting prism or mirror 110 is carried upon a bracket 111 depending from the under side of the cover plate 106. A suitable lens 112 is also carried by the bracket 111 and directs light passing through the left-hand opening 109 and the left-hand portion of the scale 108 upon the plate 80 onto the prism 110, the latter being so positioned as to reflect this light transversely across the upper part of the housing in a substantially horizontal plane. At the right-hand side of the housing, this light enters an eye piece 113 carrying a lens 114 so that an observer may view the left-hand portion of the scale 108 as revealed by the light passing through the left-hand opening 109.

A second bracket 115 depends from the under side of the plate 106 at the right-hand side thereof, this second bracket projecting downwardly a greater distance than the bracket 111. A reflecting prism or mirror 116, similar to the prism 110, is carried upon the lower end of the bracket 115 and receives light passing upwardly through the right-hand opening 109 and the right-hand portion of the scale 108. The prism 116 directs the light so received in a substantially horizontal plane toward the left-hand side of the housing, said light passing through a suitable lens 117 after leaving the prism 116, the lens 117 being provided for the usual optical purposes. Near the center of the housing 70, the light coming from the prism 116 strikes a plane mirror 118 rotatably mounted upon a depending bracket 119 suspended from the under side of the cover plate 106. The mirror 118 thus reflects the light rays back toward the right-hand side of the housing 70 where they pass through a positive correction prism 120 positioned above the lens 117 on the bracket 115, and then enter the eye piece 113. With this arrangement, the observer receives a multiple image, the lower portion of which represents the right-hand section of the scale 108 while the upper portion of the image represents the left-hand section of the scale 108. The light coming from the prism 110 passes over the top of the deflecting prism 120, while the light coming from the prism 116 passes through the prism 120. For this reason, the image appearing in the eye piece 113 will carry a horizontal dividing line between the upper and lower scale images, this line representing in effect the shadow cast by the upper surface of the prism 120. This line appears in Figs. 20 and 21, which represent sample readings or observations as viewed through the eye piece 113.

The transparent measuring plate 80 is fixed with respect to the tripod (not shown) upon which this instrument is supported. Hence, the plate does not rotate with the instrument but remains in a set position. Since the plate carries no numerical indications of angles, but only line indications of degrees, this latter fact does not lead to any confusion. However, as the housing is rotated in a clockwise direction (viewed from above), the upper image in the eye piece, representing the left-hand section of the scale 108, will appear to move to the left. At the same time, the lower image, representing the right-hand section of the scale 108, will appear to move to the right. Thus, the two scales or images appearing in the eye piece appear to move in opposite directions as the housing is rotated. Similarly, when the housing is rotated in a counterclockwise direction, each of the scale images appearing in the eye piece will apparently move in the direction opposite to that recited above. However, each scale moves in opposition to the other scale no matter in which direction the housing is rotated.

This phenomenon is utilized to obtain very accurate reading of the angle through which the housing has been rotated. Since the scales, the lines of which are spaced apart one degree, are simultaneously moving in opposite directions whenever the housing is moved, any one index line, for example one of the long lines 108a, moving across one of the images appearing in the eye piece will alternately come into register with long and short index lines appearing in the opposite image each one-half degree of rotation. Since the amount of rotation between consecutive alinings of any one index line with two adjacent long index lines in the opposite image represents one degree of rotation and the amount of rotation between consecutive alinings with adjacent long and short lines is one-half of a degree, a reference index is provided for giving an indication of how far past or how far short of an even degree or an even one-half degree the housing has been rotated. The means for reducing this indication to an actual, definite reading is described hereinafter.

This modification of the invention is provided with a clamping ring 121, similar in all respects to the ring 42 and having one side split and formed into radially projecting ears 122 through which a screw-threaded bolt 123 extends. The outer end of the screw 123 is connected through a universal joint 124 to an operating rod 125 which projects through the bottom 71 of the housing 70 and carries a knob or handle 126 upon its outer end. These elements recited are similar in all substantial respects to those previously described in connection with the clamping ring 42. By turning the knob 126, the ring 121 may be clamped upon the lower portion of the washer 75, or may be loosened with respect thereto. The ring 121 carries a radially projecting arm 127 positioned diametrically opposite the ears 122 and extending to the marginal portion of the housing, at which point it projects through an opening 128 in the bottom 71 of the housing and has its outer end engaged by a spring-pressed, adjusting, tangent screw 129 similar in all respects to the screw 53 previously described. Also similar to the screw 53, the tangent screw 129 locks the clamping ring 121 to the housing while at the same time permitting a small degree of very accurate adjustment between the two.

In carrying out observations with this modification, the arm 99 is actuated to lower the flippers 93 and cause the measuring cylinder 86 to come to rest upon the upper side of the measuring plate 80. In this position, the cylinder is immovable with respect to the plate and the tripod to which the plate is connected. If a left-hand angle is to be measured, the housing is rotated, after loosening of the clamping ring 121, until the cross hair 92 in the left-hand window 91 comes into exact registry with the zero line of the lower scale 89 appearing upon the periphery of the cylinder 86. Normally the cross hair 92 of the right-hand window 90 will at the same time be brought into registry with the zero line of the upper scale 88.

The cylinder 86 is now raised by means of the flippers 93 and clamped immovably with respect to the housing. After this operation, the housing is rotated to bring the telescope 130, connected therewith, into registry with the first point of observation. It is to be noted that the cylinder 86 does not shift with respect to the housing during this operation so that the cross hairs 92 remain in alinement with the zero line of the scales 88 and 89. Having approximately alined the telescope with the first point of observation, the clamping ring 121 may be tightened and the tangent screw 129 employed to bring the telescope into exact alinement with said point of observation.

Since the initial positioning of the tripod and the measuring plate 80 which is connected to said tripod bears no particular relationship with respect to the first point of observation, it is most often the case, when the telescope has been alined with said point, that the indicia of the plate 80 which appear in the upper and lower images in the eye piece 113 are not alined as viewed in said eyepiece. It is desirable to have such indicia alined to provide a fixed starting point, and it is for this reason that the mirror 118 is pivotally mounted upon the bracket 119. For permitting accurate adjustment of the mirror, the lower portion 131 of the bracket 119 is offset to one side and the mirror pivotally mounted upon said offset portion by means of a vertical pin 132 extending upwardly from the portion 131 and through the body of said mirror. The mirror also carries a laterally extending arm 133 which projects horizontally to a point adjacent the outer portion of the housing 76. A spring-pressed plunger 134 is carried in a housing 135 depending from the under side of the cover plate 106, and said plunger engages one side of the arm 133. The opposite side of the arm is engaged by the inner end of an adjusting, tangent screw 136 extending horizontally with respect to the housing and engaging in a screw-threaded boss 137 positioned at one side of the housing. By adjusting the screw 136, the mirror 118 may be caused to pivot about the pin 132 and thus change the angle of reflection of the light rays striking said mirror from the prism 116. By employing this structure, the index lines of the upper and lower images appearing in the eye piece 113 may be brought into exact and accurate alinement so as to provide a fixed starting point from which to make observations. From this point onward in the procedure, the position of the mirror is not altered, since to do so would incorporate an indeterminate error in the final reading obtained.

At this point in the operation, the zero lines of the cylinder 86 have been accurately and exactly alined with the first point of observation. It is to be noted that the accuracy of setting or alining of the cross hairs 92 with said zero lines in the initial step recited hereinbefore is not particularly critical since the alinement of the index lines appearing in the eye piece 113 is relied upon for the required accuracy and the scales 88 and 89 are utilized only for the purpose of giving a reading of the observed angle within the nearest one degree.

Having in his manner accurately alined the measuring cylinder 86 with the initial point of observation by means of rotation of said cylinder and compensation of the images appearing in the eye piece, the cylinder is lowered by actuating of the flippers 93 so as to come to rest upon the upper surface of the measuring plate 80. The cylinder is now fixed with respect to the plate and therefore with respect to the first point of observation, and the housing may be rotated without impairing such setting. The clamping ring 121 is released and the housing is rotated so as to bring the telescope in proximate aline-ment with the second point of observation. The clamping ring 121 is now tightened or secured and the tangent screw 129 again employed to bring the cross hairs of the telescope into exact alinement with the second point of observation. Having made such alinement, the approximate observed angle may be read through either of the windows 90 or 91, depending upon whether a right-hand or left-hand angle is being observed. However, upon observation through the eye piece 113, it will almost invariably be found to be the case that the index lines appearing in the upper and lower images are not in alinement with one another unless by pure coincidence the angle measured is exactly an even degree or number of degrees. It is in providing accurate means for measuring the apparent rotation required to bring said index lines again into alinement that this invention achieves a considerable portion of its extremely high accuracy of reading.

It has previously been pointed out that in moving the housing to the right in a clockwise direction, the upper scale appears to move to the left within the eye piece 113 while the lower scale appears to move to the right. Conversely, the scales move in opposite directions when the housing is rotated in a left-hand or counterclockwise direction. Keeping this fact in mind, the observer will know upon looking through the eye piece whether the instrument has been rotated less than or more than one-half of one degree past the last full degree of rotation in moving to the second point of observation. Fig. 20 of the drawings may be employed to illustrate this point by assuming the scales appear as represented in this figure after having measured a right-hand angle. Since the upper scale is known to move to the left and the lower scale to the right, a comparison of the long index lines 108a shows that the instrument has been revolved past the last full degree but not quite one-half of one degree past such point. This fact may be recognized from the realization that continued rotation to the right must be effected before the long index lines 108a in the upper image come into alinement with the short index lines 108b in the lower image. The observer is therefore furnished with the information that a small additional angular measurement of less than thirty minutes must be determined to complete the measurement of the angle at hand, and that such small additional measurement must be added to the rough angular reading obtained from the measuring cylinder 86. For the purpose of further illustration, and assuming that a left-hand angle has been measured, the observer can determine at a glance from the indications illustrated in Fig. 20 that the instrument has been rotated more than thirty minutes past the last full degree of angular measurement. This is obviously true since the long index lines 108a in the upper image have passed the short index lines 108b in the lower image in the course of their right-hand travel, and that less than one-half degree additional rotation is required to again bring the long index lines 108a of the upper and lower images into alinement.

An optical wedge or prism 138 is provided for the purpose of causing the index lines appearing in the eye piece to undergo apparent movement and become alined. The wedge 138 is interposed in the light path between the prism 110 and the eye piece 113 and depends from a carrier pin 139 projecting through an elongate slot 140 cut in the cover plate 106. The slot 140 is in vertical alinement with the aforementioned light path so that the wedge 138 may be moved to various points along said path. The pin 139 depends from a vernier carriage 141 positioned within an elongate vernier housing 142 provided on the upper side of the cover plate 106 and overlying the slot 140. The housing is trapezoidal in cross-section and is wider at its bottom than the slot 140 so as to provide marginal surfaces 143 upon which the carriage 141 may ride. An elongate, square-threaded adjusting screw 144 extends lengthwise of the housing 142 and engages within a screw-threaded bore 145 extending longitudinally of the carriage 141. One end of the screw 144 is journaled in one end wall of the vernier housing, while the opposite end of the screw extends through the opposite end wall of the housing and carries a suitable operating knob 146. By turning the knob 146 and thus the screw 144, the vernier carriage and the optical wedge may be caused to move longitudinally of the light path extending from the prism 110 to the eye piece 113.

Since the wedge 138 has its opposite vertical faces disposed at an angle with respect to one another, the wedge functions to cause lateral deviation in a horizontal plane of the light rays coming from the prism 110, whereby the rays are caused to strike the eye piece 113 at a certain definite point. However, upon moving the wedge closer to or away from the prism 110, the light rays are caused to strike the eye piece at different points although they are bent through the same angle, this being true since the distance between the wedge and the eye piece is being varied. The wedge thus furnishes a second means of adjusting the position of the index lines in the upper and lower images appearing in the eye piece, such adjustment being in the position of the upper lines in respect to the lower lines because the wedge is interposed in the path of the upper light beam only, and does not affect the position of the lower image appearing in the eye piece.

Elongate, transparent windows 147 and 148 (Fig. 12) are provided in the right and left-hand side walls, respectively, of the vernier housing 142, said windows being suitably sealed by strips of glass or any other suitable material. The strips are designated in the drawings by the numerals 149 and 150 for the right and left-hand windows, respectively. Upstanding ridges 149' and 150' are formed integrally with respect to the cover plate 106 and extend into the housing 142 on each side of the slot 140 outwardly of the marginal surfaces 143. The outer surfaces of the ridges are in planar alinement with the outer surfaces of the vernier carriage 141 and carry suitable scales 151 and 152 calibrated on one-half minutes and extending from zero to thirty with additional divisions being provided beyond thirty for the purposes of accomplishing vernier readings. The left-hand scale 151 is illustrated in Fig. 18, while the right-hand scale 152 is shown in Fig. 22. As shown in these figures, the scales appear in the lower longitudinal halves of the window strips 149 and 150. The vernier carriage 141 carries a suitable movable vernier scale upon each side, said scales appearing through the upper portion of the window strips 149 and 150. The left-hand movable scale 153 is positioned immediately above the left-hand fixed scale 151 while the right-hand movable vernier scale 145 is positioned immediately above the right-hand fixed scale 152. The vernier scales are calibrated from left to right from zero to thirty, each division representing one second of angular measurement, it of course being kept in mind in connection with all of these scales that the angularity of the wedge 138 is so selected that in moving said wedge from one extremity of its path to the other, the index lines appearing in the eye piece 113 are caused to shift one-half of one degree, or thirty minutes, with respect to one another.

Since the upper and lower images in the eye piece move in opposite directions depending upon whether the housing 70 is rotated to the right or to the left, the fixed scales 151 and 152 must extend in opposite directions. This is, of course, accomplished by the disposition of the scales on opposite sides of the housing 142. The movable vernier scales are similarly arranged so as to extend in opposite directions. Thus, if the zero point of the left-hand, movable, vernier scale is in alinement with the zero line of the left-hand, fixed scale, the zero line of the right-hand, movable, vernier scale will be in alinement with the thirty minute line of the fixed right-hand scale.

This is necessary since longitudinal movement of the wedge 138 causes shifting of the upper image in only one direction whereas in operation, during revolution of the housing 70, the upper image may move to the right or to the left depending upon whether a left-hand or a right-hand angle is being measured, and it must be moved a small additional amount to the left or to the right to effect alinement of the index lines in the eye piece and thereby measure the small additional angle increment referred to hereinbefore. Normally, the right-hand scale is employed for reading right-hand angles, and the left-hand scale for left-hand angles although obvious variations in procedure and operation may be employed if desired.

At the beginning of the measuring operation, in the present instance, the right-hand, movable, vernier scale is positioned that its zero line is in vertical alinement with the zero line of the right-hand, fixed scale. The zero reading upon the first point of observation is then effected and the mirror 118 adjusted to cause alinement of the images appearing in the eye piece 113. The position of the wedge 138 is not shifted during these steps nor in the latter steps until it is desired to take the final reading. As previously described, the cylinder 86 is initially positioned at zero and then fixed with respect to the immovable plate 80. At the same time, the mirror 118 is adjusted to bring the index lines of the upper and lower images in the eye piece 113 into vertical alinement. Also as previously described, the housing is then rotated and the telescope 130 brought into exact alinement with the second point of observation, at which time a rough reading may be taken from one of the scales 88 or 89. At this point, the index lines of the images appearing in the eye piece are most probably not alined with one another. The operator then rotates the knob 146, thereby shifting the carriage 141 and the wedge 138 longitudinally between the eye piece and the prism 111. This movement is continued until the index lines in the upper and lower images have been precisely alined with one another. Then, by taking a reading from the right-hand, fixed vernier scale, and interpolating this reading to further accuracy by means of the right-hand, movable, vernier scale, an accurate reading is had of the small additional angle, or angular increment, required over and above the even degree or whole degree reading obtained from the scale 88 to obtain the angle to the right. In actuality, the housing is not moved during this process and the telescope remains trained exactly upon the second point of observation. The movement of the wedge 138 causes the upper scale image to undergo apparent reverse movement, and thus causes apparent reverse shifting of the housing through that small additional amount over and above the last whole degree of rotation. In actuality, this increment of rotation is measured without in fact making such rotation. However, by arbitrary selection of the vernier scales, this observed data may be read in terms of the fraction of the observed angle over and above the last whole degree.

In making observations of left-hand angles, the vernier carriage 141 may be shifted to the opposite end of the housing 142, or it may be left in the position shown in Fig. 8 and the reading obtained therefrom, plus 30 minutes, added to the next lower degree as indicated in the left-hand window 91.

The procedure for measuring both right and left-hand angles is the same and the angular relation between any two points may be considered as either to right or left. If the position of the vernier scale as shown in Fig. 8 is used as a beginning point, the final vernier readings for both right and left-hand angles are added to the next lower half degree as indicated in the windows. If care is used in the initial setting of the cylinder it should be possible to estimate whether or not a half degree should be added to the next lower graduation in addition to the vernier reading. The relative positions of the long to the short graduations of the upper and lower images, as illustrated in Figs. 20 and 21, at both beginning and final readings are a positive guide as to whether to add 30 minutes to the vernier reading. In all cases it would be added to one of either the right or left angle and not to the other. Both the right and the left angles for any observation may be read by adding to the window readings the vernier reading of the scale observed above it. It is possible to use the opposite end of the vernier scale as a starting point but the reading would still be added. The rule for adding 30 minutes to the right or left reading from the position of long to short graduations of the images would be reversed in this case and it is probable that most operators would prefer to always use the same position of the verniers as a starting point for all cases.

Obviously if the telescope is trained upon one point and then advanced to a second point the final result would be the same whether rotation was actually accomplished either to right or to left. The mechanical progression differs however in that if the instrument is rotated to the right, the right angular reading increases from 0°-0'-0" to 360°-0'-0" at the same time the left reading decreases from 360° or its equivalent of 359°-59'-60". Similarly, if the instrument is rotated to the left, the left reading increases and the right reading decreases in the same manner. The mechanical arrangement is such that if the images are matched upon the initial setting with like graduations alined, or long with long and short with short, upon reaching the final position, the images may be alined by movement of the wedge to register in one of the two conditions of alinement, like or unlike. If the measurement is an exact number of degrees they will be like; if an even number of degrees plus 30 minutes they will be unlike. Since either would seldom be the case, the wedge is employed to deflect the upper image to effect alinement. The arrangement of the wedge and its vernier scales is selective in that either the right or the left scales may be initially set on zero. This automatically places the opposite scale on 30'-0". If the right scale is set on zero as in Fig. 8, any shifting of the wedge from this terminal position must be in the direction that will effect an increase in the right reading from 0'-0" and a decrease in the left reading from 30'-0". This affects the upper image in such a way that it is shifted in the opposite direction to its movement when the telescope is rotated to the right. Similarly, if the wedge is set at the opposite end of the scale it can only be advanced through the increment of leftward rotation. If, after shifting the position of the wedge from either terminus to cause register of the images and like graduations are alined, the increment is added to that angle that is in positive agreement with the initial setting of the wedge scales. If unlike graduations are alined an additional increment of 30' is added to that angle. At the same time, since the opposite vernier scale would have decreased in register from a reading of 30' which would have required an additional 30' initially to complement the reading of zero on the opposite scale or an actual value of 60' because the next lower degree is observed in the windows 90 and 91 and the total of the vernier readings, when added to the total of the window readings, must equal 360°. Therefore, the reading of this opposite vernier plus 30' would be added to the angle out of positive agreement with the setting of the wedge scale in the first case, and its reading alone added in the second case.

This action may be clarified by a hypothetical assignment of positive values to movements corresponding to rightward rotation of the telescope and negative values to those corresponding to leftward rotation. The cylinder, being indexed in both directions, will register both a positive and a negative value for any position. The wedge may be selectively set to be shifted in either a positive or negative direction only from one or the other terminal positions but since its vernier scales run in opposite directions they will register a real value for its position relative to either or, both a positive and negative value. If the initial setting of the wedge is as in Fig. 8, the effect of its advancement upon the upper image will be negative but the real measurement of its movement will register on the right vernier scale. The initial 30" reading of the left vernier scale is correspondingly reduced by the same value. This has the practical effect of causing the movement of the wedge to register under the opposite sign so that the right scale registers the increment to be added to the right reading of the cylinder, which is the actual amount by which the images were out of register before they were rightwardly reduced and leftwardly increased to bring about registry.

To summarize, if the vernier scales are initially set as in Fig. 8 and the initial and final conditions of alinement are the same, the right vernier scale reading is added to the right cylinder scale reading, and the left vernier scale reading plus 30' is added to the left cylinder scale reading. If the initial and final conditions of alinement are the opposite case, the 30' increment is added to the right reading instead of the left; but, if the initial setting of the vernier scales is opposite to Fig. 8, the 30' increment must be added to the opposite angle in both cases since it registers its real value on the left or negative scale.

Figs. 18 through 23 illustrate the appearance of the various scales in the course of making actual angular observations. It is believed that the mechanics of operation of this system will best be clarified by a recitation of the steps and operations in making observations of a right and left-hand angle employing the same two points of observations so that said angles are complementary. To begin with, Fig. 19 represents the appearance of the right-hand scale 88 as viewed through the right-hand window 90 after the telescope has been trained exactly upon the second point of observation. The cross hair 92 indicates the observed angle to be something more than 35° but less than 36°. The indication is also that the observed angle is less than one-half degree greater than 35°, but such indication need not be particularly relied upon for an exact determination of the observed angle.

Fig. 20 is a representation of the indications appearing in the eye piece 113 before the prism 138 has been moved to bring the upper and lower index lines into agreement. Keeping in mind that a right-hand angle is being observed and that the upper image is therefore moving to the left, an examination of Fig. 20 will disclose that the housing has been moved less than one-half of one degree past the last whole degree, this indication appearing in the fact that the upper long index lines 108a are only to the left of the last lower long index lines 108a, but not to the left of the next short index lines 108b in the lower image. This shows that the long upper index lines 108a have moved to the left of, or moved past, the long index lines but not the short index lines in the lower image. Therefore, at the outset, the observed angle is known to lie between 35°–0' and 35°–30'.

The vernier scales and the optical wedge 138 are now employed to bring the index lines back into agreement or alinement so as to determine the small additional angle through which the housing has been rotated past the last whole degree. As previously described, such an adjustment is effected by means of the screw 144, the latter being rotated by the knob 146 until the wedge 138 has moved into such a position as to bring the upper and lower index lines into agreement, as illustrated in Fig. 21. After such adjustment has been effected, the vernier scales will appear as illustrated in Fig. 18, and the small additional angular increment may be read directly therefrom. The reading illustrated is 8', plus less than 30" since the zero line of the movable vernier scale has not passed and is to the left of the half minute indication on the fixed scale, plus 16", the interpolated figure obtained through a reading of the movable vernier scale in the usual manner. The total observed reading is thus 35°–08'–16".

As previous pointed out, the angle between any two points of observation may be measured as a right-hand or as a left-hand angle since the resultant readings will be the same regardless of whether the telescope is rotated to the right from the first to the second point of observation, or whether it is rotated to the left between said points of observation. Assuming the same two points of observation as employed in the immediately preceding example, but also assuming it is desired to read the left-hand angle rather than the right-hand angle, it is obviously immaterial whether the telescope was rotated in a right or a left-hand direction in order to become exactly alined with the second point of observation, but it is helpful to assume for the purposes of determining the left-hand angle, that the telescope was rotated in a left-hand direction. Under these circumstances, it is to be kept in mind that the upper image appearing in the eye piece will appear to be moving to the right as the telescope is so revolved or swung. Fig. 23 represents the appearance of the left-hand scale 89 which appears in the left-hand window 91 and displays a reading of between 324° and 325°. A close examination of the figure will show that the angle to be observed is greater than one-half degree more than 324°. However, as previously pointed out, this indication alone need not be employed to determine this fact since the images appearing in the eye piece 113 will settle the question beyond any doubt.

Figs. 24 and 25 represent the indications appearing in the eye piece 113 before and after the prism 138 has been adjusted in order to aline the upper and lower index lines 108a and 108b. Fig. 24 displays the relation of the upper and lower images before such alinement and is, of course, identical to Fig. 20 since the telescope is exactly trained upon the same second point of observation as employed in connection with said Fig. 20. Indeed, it may be that the telescope has not been moved at all since the observation of the right-hand angle, the assumption of rotation of the telescope to the left in order to come into alinement with the second point of observation being made merely to clarify the steps of reading the left-hand angle.

Remembering that the upper scale is presumed to have been moving in a right-hand direction since the left-hand angle is being observed, it will be apparent from an examination of Fig. 24 that the housing has been moved more than one-half of one degree past the last whole degree, this indication appearing in the fact that the upper long index lines 108a are not only to the right of the last lower long index lines 108a, but also to the right of the last short index lines 108b in the lower image. This makes it apparent that the long upper index lines 108a have moved to the right of, or moved past, both the long and the short index lines in the lower image. For this reason, the observer knows that 30 minutes, or one-half degree must be added to the reading of 324° obtained from an examination of the scale 89 which shows the next lower whole degree to be 324°.

The optical wedge 138 is again employed to bring the index lines back into alinement so as to determine the small additional angular increment through which the housing and telescope have been rotated past the indication of 324°–30' obtained from the observation of the scale 89 and the initial indication appearing in the eye piece 113 as illustrated in Fig. 24. In making such adjustment, it is to be noted that the upper scale is apparently caused to move to the right which is the same direction in which the scale was moving when the housing was being rotated in a left-hand direction. This small additional movement therefore represents the angle which must be subtracted from the next whole degree, or next half degree, in order to obtain the true left-hand angle. However, as previously described, the zero line of the left-hand movable vernier scale 153 is alined with the 30″ index of the left-hand fixed scale 151 when the zero line of the right-hand movable vernier scale 154 is alined with the zero line of the right-hand fixed scale 152. Thus, as the vernier scale is moved in affecting the alining adjustment described, the small additional angle measured is subtracted from the next higher whole degree as said zero line progresses from the 30″ mark on the left-hand fixed scale toward the zero line of said scale. Thus, the indication of the left-hand scales 151 and 153, as illustrated in Fig. 22, gives a direct reading of the angle which must be added to the 324°–30′ previously ascertained in order to complete the determination of the observed angle. An observation of Fig. 22 shows the zero line of the movable scale to read something over 21′ and more than 30″ more than 21′. An additional increment of 21′–30″ is thus given. A reading of the vernier scale itself gives an indication of 14″ so that the total reading is 324°–51′–44″.

It is again pointed out that the position of all of the elements of the system remains the same as when the right-hand angle was being observed, and it is only necessary to follow the rules of reading set out hereinbefore. Namely, beginning with the right-hand vernier scale set at zero, the reading of the right-hand vernier scale is added directly to the reading of the right-hand scale 88 and the reading of the left-hand vernier scale plus 30″ is added to the reading of the left-hand scale 89 provided the index lines 108a and 108b are alined in the same fashion as when the system was initially set upon the first point of observation, and also assuming that the readings appearing in the windows 90 and 91 are to be the next lower whole degree below the cross hairs 92. If the index lines 108 are alined in a fashion dissimilar to that appearing at the initial point, then the 30″ increment is to be added to the right-hand angle rather than the left-hand. Similarly, if the movable vernier scales are set at the beginning so that the zero line of the left-hand scale is alined with the zero line of the left-hand fixed scale 151, then the above procedure is to be reversed in so far as the adding of the 30″ increment is concerned.

With this structure, a very accurate and highly reliable mechanism is provided for making extremely accurate angular measurements. A structure is also provided in which the opportunity for occurrence of objective errors due to mechanical structure has been greatly minimized if not eliminated. Provision is made for centering the transparent measuring plate 80 with respect to the spindle 13 so that errors due to eccentricity of the plate may be substantially eliminated through proper adjustment. Once adjusted, the plate is not readily subject to misalinement or malfunctioning, nor is it apt to become misalined through ordinary use. Should there remain any small residual eccentricity in the positioning of the plate, the utilization by this system of indications from diametrically-opposed points on the plate will make adequate compensation. Any deviation in one image will be compensated for by an equal and opposite deviation in the second image, and the error eliminated. The adjusting mechanism for the mirror 18 is not particularly critical in that the angular position of the mirror alone determines the adjustment affected by it. For this reason, minor inaccuracies in the adjusting screw 136 and the allied elements is of no particular concern since all that is necessary is that the mirror be adjustable and that means be provided for holding it in its adjusted position.

The optical wedge 138 is also protected to a large extent from errors arising in or from mechanical imperfections. The wedge is connected directly to the carriage 141 which also carries the movable vernier scales, the various elements being affixed or secured into a unitary whole. Being rigidly connected, the wedge moves only when the scales move, and a relative sloppiness of fit between the screw 144 and the screw-threaded bore 145, or between the screw and the housing 142, does not have any effect upon the reading obtained. So long as the wedge 138 is adjusted to and remains in the position wherein the index lines of the upper and lower images appearing in the eye piece 113 remain in alinement, the reading of the vernier scales is reliable. Should the index lines become misalined for any reason, they are readily returned to the proper alined position by means of the screw 144 and the reading again checked in this manner. Of course, it is entirely customary in the use of the instrument to repeat certain of the operations for the purpose of checking the various adjustments and settings, such repetition of procedure or steps being the usual practice in making observations of this accuracy. For instance, after adjusting the position of the wedge 138, the vernier scales may be read, and then the setting of the wedge again checked by peering through the eye piece to make certain that the index lines remained in alinement before and after the reading was taken. For increasing the amount of light passing upwardly through the openings 109, the usual type of parabolic condensing mirror 158 is positioned beneath each of said openings, the mirrors being pivotally mounted for universal adjustment so as to gather light from any direction and reflect it upwardly through said openings. The employment of these mirrors permits operation of the instrument under substantially any conditions and increases its effectiveness.

As before recited, the usual type of telescope 130 is carried by the housing 70. The telescope has a trunnion 159 projecting laterally from its left-hand side and journaled in the upper end of a bipod standard 160 projecting upwardly from the cover plate 106 or the housing, and preferably the latter to enhance rigidity. A shaft or axle 161 (Fig. 14) projects horizontally from the opposite side of the telescope 130 and is centrally received within a vertical, measuring plate housing 162 carried upon a pair of depending legs 163 affixed to the upper surface of the cover plate 106 or to the housing and positioned in a vertical plane adjacent the right-hand side of the telescope. The housing 162 is in the form of a relatively shallow cylinder having a solid bottom 164 disposed adjacent the telescope 130 and an open outer side adapted to be closed by a circular cover plate 165 having a marginal depending flange 166 which engages within the diameter of the annular wall 167 of said housing.

The shaft 161 (see Fig. 14) extends through an axial opening 168 provided in the bottom 164 so as to project into the interior of the housing and carries upon its inner end a square boss or stud 169 similar to the stud 19. A reduced, screw-threaded pin 170, similar to the pin 20, projects axially inwardly from the stud 169. A washer 171, substantially identical to the washer 75, has a square opening 172 in its central portion and is received upon the stud 169. The washer 171 carries a transparent, measuring plate 173, similar to the plate 80, affixed thereto by screw-threaded bolts 174 and being positioned by adjusting screws 175 similarly to the plate 80. The plate 173 is thus disposed in a vertical plane within the housing 162, and being secured to the washer 171 and the shaft 161, is adapted to rotate in a vertical plane with the telescope 130. A clamping ring 176 encircles the inner portion of the washer 171 and carries a laterally extending adjusting arm (not shown) adapted to be adjusted with respect to the housing 162 by a suitable tangent screw 177, similar in all respects to the tangent screw 128, previously described. A clamp operating rod 178 extends through the annular wall 167 of the housing and is adapted to tighten or loosen the clamping ring upon the washer 171. The shaft 161, and therefore the telescope 130, may thus be secured to or released from the housing 162, or they may be minutely and accurately adjusted with respect to the housing by means of the tangent screw 177.

This vertical angle measuring system does not incorporate a measuring cylinder similar to the cylinder 86, but instead carries an additional scale or scales upon the plate 173. This scale, designated by the numeral 179 may be viewed through a window 180 cut in the upper portion of the cover plate 165. The scale 179 is divided into a clockwise and a counterclockwise scale, each extending from zero at one side of the plate to 180° at the diametrically opposite side of the plate. The scales are displaced 90° with respect to the longitudinal axis of the telescope so that when the latter is in its normal, horizontal position, the zero line appears in the window 180. If desired, additional, undisplaced scales may be incorporated for measuring angles with respect to the zenith. As the eye piece of the telescope is moved downwardly in tilting the latter, the right-hand or clockwise scale progresses past the window 180. Similarly, as the eye piece is raised in tilting the telescope downwardly, the left-hand scale, or negative scale, progresses past the window.

As was previously described in connection with the operation of the horizontal angular measuring system, the scale 179 is employed merely to obtain a proximate reading of the observed angle, such reading being accurate only to the nearest degree. For the purposes of exactly determining this angle, an optical system is employed which is substantially identical to that employed in the horizontal system and has been designated by the same numerals in the illustration of the vertical system. The prisms 110 and 116 are employed in the same fashion, and the adjustable mirror 118 with its adjusting screw 136 and the optical wedge 138 being employed in the same manner and being arranged in a substantially identical fashion with respect to one another. A similar vernier carriage 141' and the vernier carriage adjusting screw 144 are employed, but a slight modification is made in the housing for the vernier carriage. This housing 181, is rectangular in cross-section and carries only a single window 182 upon its outer side. The window exposes a fixed vernier scale 183 provided above the carriage 141', and a similar, fixed, reversed, vernier scale 184 below the carriage. A double, movable, vernier scale is provided upon the outer surface of the carriage 141' so as to be disposed contiguous to the upper and lower scales 183 and 184. The movable vernier scale includes an upper scale 185 for use with the upper scale 183, and a reversed lower scale 186 for use with the lower scale 184. This vertical modification is further altered in that the eye piece 113' carries a reflecting mirror or prism 187 which reflects the images received from the prisms 110 and 116 at right angles into a laterally extending eye piece tube 188. This structure is employed since it is not always convenient or practical for the operator of the instrument to view the images provided through the annular side wall of the housing 164. The housing is disposed relatively close to the telescope 130, and an eye piece extending from the annular wall 167 would be too close to the telescope for practical use. Hence, the employment of the prism 187 and the laterally projecting eye piece tube 188.

The vertical angle measuring system is employed in substantially the same manner as the horizontal angle measuring system. The initial setting of the proximate scale, which appears upon the measuring cylinder 86 in the horizontal system, is not necessary since the zero line of the scale 179 is arranged to appear in the window 180 when the telescope is in its horizontal position. When angles are being measured as above or below the horizontal, this fixed starting point may be employed with facility. Of course, if additional scales are provided for measuring from the zenith, the latter are used as a starting point when such observations are to be made. The housing 162 is provided with light-admitting openings 189 disposed at diametrically opposite points and adapted to pass light through the plate 173 to the prisms 110 and 116. The plate 173 carries a scale, similar in all respects to the scale 108, and interposed between the openings 189 and the aforementioned prisms. The images of this scale which appear in the eye piece are employed in the same fashion as previously described, and the mirror 118 and wedge 138 employed for adjustment in the same manner. The upper vernier scales 182 and 185 are employed for reading positive or upwardly directed angles, while the lower vernier scales 184 and 186 are employed for measuring negative or downwardly directed angles. Of course, if it is desired to measure an angle from a point above the horizon to a point below the horizon, both the upper and lower angles may be measured and added, or the telescope may be set upon one point and the scale indications brought to an even degree by suitable adjustment of the mirror 118. Then, upon swinging to the second point, the final reading may be obtained through adjustment of the wedge 138 and the initial reading added to this second reading, the second mode of operation being preferable in that fractions of degrees do not need to be added and that some operational steps may be eliminated.

In Fig. 15 is shown a schematic diagram of the optical system employed in both the horizontal and vertical angular measuring systems. The right-hand light beam which will be designated by the letter A, passes upwardly to the prism 116 and is reflected through the lens 117 to the adjustable mirror 118. From the mirror, the light ray A is reflected back to the fixed correcting prism 120 and thence through the lens 114 into the eye piece 113 to provide the lower image in said eye piece of the right-hand portion or section of the scale 108.

The left-hand light beam B passes upwardly through the left-hand portion of the plate 80 and therefore the left-hand section of the scale 108, through the lens 112 to the prism 110. From the prism, the light beam B is reflected transversely across the instrument, passes above the mirror 118 and strikes the adjusting prism or optical wedge 138. This second light beam is deflected by the wedge 138 in passing therethrough and extends above the fixed wedge 120 to the lens 114. From the lens 114 the light beam B passes to the eye piece 113 to provide the upper image appearing therein, said image representing the left-hand portion of the scale 108. The mirror 118 provides means for adjusting the angular path of the light beam A as it is reflected transversely of the housing, while the optical wedge 138 provides means for deflecting the transverse path of the light beam B. It is in the utilization of these two means, coupled with the novel scale 108 and the vernier reading mechanism, that many of the advantages of this invention reside, as well as in the provision of the non-rotatable connection between the measuring plate 80 and the support.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An angle measuring instrument including, a fixed support, a movable housing carried by the support, a transparent horizontal angle measuring plate in the housing secured to the support, a telescope mounted for swinging in a vertical arc upon the housing, a casing carried by the housing and affixed thereto, a transparent vertical measuring plate in the casing secured to the telescope, indicia on the horizontal angle measuring plate and the vertical angle measuring plate, both the housing and the casing having an optical measuring system including, means for passing beams of light through two portions of the indicia carried by each plate, an eye piece for each plate, means for directing the two beams of light for each plate into the eye piece for that plate so as to cause two images of said plate indicia to appear in each eye piece, an adjustable mirror for each plate for shifting one of the images appearing in the eye piece of that plate, and an adjustable prism for each plate for shifting the other of the images appearing in the eye piece of that plate, said mirror and said prism being adjustable separately and independently of one another.

2. An angle measuring system including a movable support, a fixed support, an annular scale member for indicating the approximate angular position of the movable support, said member carrying indicia, means for observing one portion of said indicia in a field of observation, means for observing a second portion of said indicia in the field of observation, a prism interposed in the course of the light passing to the field of observation from one of said portions for changing the course of said light to cause the observed portions to become alined in one position of the movable support, an indicia carrying scale carried by the movable support, a scale reading device rigidly affixed to the prism and movable therewith, and a mirror interposed in the course of the light passing to the field of observation from the other of said portions for changing the course of said light so as to cause the observed portions to become alined in another position of the movable support, whereby adjustment of said mirror results in alining of the observed portions of the annular scale member indicia without necessitating the movement of the prism.

3. An angle measuring instrument including, a fixed support, a fixed measuring limb secured to the fixed support and having an annular scale graduated into angle defining indicia, a housing rotatably mounted on the support, a telescope carried by the housing and rotatable therewith, a second measuring limb rotatably carried on the support and rotatable with respect to the housing, the second measuring limb having a scale graduated into angle defining indicia, means forming a part of the instrument for reading the second measuring limb scale, and means carried by the housing for reading the fixed measuring limb scale, wherein the means for reading the fixed measuring limb scale includes, an eye piece, an optical system for directing beams of light from two spaced portions of the latter scale into the eyepiece, separate independently adjustable optical elements interposed in the two light beams for deflecting said light beams individually and separately, and separate independently adjustable mounts carrying the adjustable optical elements.

4. An angle measuring instrument as set forth in claim 3, and a reading scale on one of the mounts.

5. An angle measuring instrument as set forth in claim 3, wherein one of the adjustable optical elements is a mirror and the other is a prism.

6. An angle measuring instrument as set forth in claim 5, a reading scale carried by the housing, and a vernier associated with the reading scale, the vernier and prism being rigidly connected together to form an integral vernier-prism unit.

IRWIN L. CUNNINGHAM.

REFERENCES CITED

The following references are of record in the file of this patent:

UNITED STATES PATENTS

| Number | Name | Date |
|---|---|---|
| 774,515 | Geier | Nov. 8, 1904 |
| 1,502,223 | Abraham | July 22, 1924 |
| 1,754,872 | Baker et al. | Apr. 15, 1930 |
| 2,221,317 | Wild | Nov. 12, 1940 |
| 2,363,877 | Larsen et al. | Nov. 28, 1944 |
| 2,480,237 | Goodfrey et al. | Aug. 30, 1949 |

FOREIGN PATENTS

| Number | Country | Date |
|---|---|---|
| 23,648 | Great Britain | Dec. 22, 1892 |
| 246,650 | Great Britain | Feb. 4, 1926 |
| 759,485 | France | Nov. 16, 1933 |
| 377,619 | Italy | Dec. 23, 1939 |